US010529301B2

(12) United States Patent
Yun et al.

(10) Patent No.: US 10,529,301 B2
(45) Date of Patent: Jan. 7, 2020

(54) DISPLAY DEVICE FOR ADJUSTING COLOR TEMPERATURE OF IMAGE AND DISPLAY METHOD FOR THE SAME

(71) Applicant: SAMSUNG ELECTRONICS CO., LTD., Suwon-si, Gyeonggi-do (KR)

(72) Inventors: Sang Un Yun, Seoul (KR); Sung Wan Koo, Seoul (KR); Su Ji Kim, Seongnam-si (KR); Ha Yeon Kil, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

(21) Appl. No.: 15/852,006

(22) Filed: Dec. 22, 2017

(65) Prior Publication Data

US 2018/0182357 A1 Jun. 28, 2018

(30) Foreign Application Priority Data

Dec. 22, 2016 (KR) .................. 10-2016-0176329

(51) Int. Cl.
*G09G 5/10* (2006.01)
*G09G 5/02* (2006.01)
(Continued)

(52) U.S. Cl.
CPC ............. *G09G 5/10* (2013.01); *G09G 3/3406* (2013.01); *G09G 5/02* (2013.01); *H04N 5/58* (2013.01);
(Continued)

(58) Field of Classification Search
None
See application file for complete search history.

(56) References Cited

U.S. PATENT DOCUMENTS 6,339,429 B1 * 1/2002 Schug ............... G09G 5/00
345/589
7,202,458 B2 4/2007 Park
(Continued)

FOREIGN PATENT DOCUMENTS

JP 10-83146 3/1998
KR 10-2005-0040296 5/2005
(Continued)

OTHER PUBLICATIONS

International Search Report, PCT/ISA/210, dated Apr. 5, 2018, in corresponding International Patent Application No. PCT/KR2017/015393.

(Continued)

*Primary Examiner* — Jason A Pringle-Parker
(74) *Attorney, Agent, or Firm* — Staas & Halsey LLP (57) ABSTRACT

A display device includes a display, a sensor module which senses a color temperature of light incident to the sensor module from an outside of the display device, and a processor electrically connected to the display and the sensor module. The processor operates in a first mode or a second mode or is turned off, depending on a user input, outputs a moving picture to the display in the first mode, outputs a still image to the display if detecting a user, turns off the display if failing to detect the user, in the second mode, adjusts a color temperature of the still image based on the color temperature sensed by using the sensor module in outputting the still image, and outputs the still image having the adjusted color temperature to the display.

19 Claims, 4 Drawing Sheets

(51) Int. Cl.
*H04N 5/58* (2006.01)
*H04N 9/73* (2006.01)
*G09G 3/34* (2006.01)

(52) U.S. Cl.
CPC ....... *H04N 9/73* (2013.01); *G09G 2320/0626* (2013.01); *G09G 2320/0666* (2013.01); *G09G 2320/0686* (2013.01); *G09G 2330/027* (2013.01); *G09G 2340/0407* (2013.01); *G09G 2354/00* (2013.01); *G09G 2360/144* (2013.01); *G09G 2380/16* (2013.01)

(56) References Cited

U.S. PATENT DOCUMENTS

| | | | |
|---|---|---|---|
| 8,081,197 B1* | 12/2011 | Jude | G06F 3/04845 345/628 |
| 8,432,305 B2 | 4/2013 | Choi et al. | |
| 8,892,284 B2 | 11/2014 | Diaz et al. | |
| 8,941,530 B2 | 1/2015 | Choi et al. | |
| 8,988,271 B2 | 3/2015 | Choi et al. | |
| 9,066,043 B2 | 6/2015 | Jung | |
| 9,542,838 B2 | 1/2017 | Choi et al. | |
| 9,804,662 B2 | 10/2017 | Park et al. | |
| 9,911,322 B2 | 3/2018 | Choi et al. | |
| 9,942,507 B2 | 4/2018 | Jung | |
| 2005/0087671 A1 | 4/2005 | Park | |
| 2007/0040033 A1* | 2/2007 | Rosenberg | A47G 1/02 235/462.36 |
| 2007/0070258 A1* | 3/2007 | Kinoshita | G09G 3/2092 348/790 |
| 2008/0297589 A1* | 12/2008 | Kurtz | H04N 7/147 348/14.16 |
| 2009/0122206 A1 | 5/2009 | Jung | |
| 2009/0237423 A1* | 9/2009 | Shih | G09G 3/3406 345/690 |
| 2009/0295787 A1 | 12/2009 | Yao et al. | |
| 2010/0026816 A1* | 2/2010 | Bergstrom | H04N 1/00183 348/207.11 |
| 2010/0064332 A1* | 3/2010 | Krikorian | H04N 21/2181 725/110 |
| 2011/0007141 A1* | 1/2011 | Hirano | H04N 5/63 348/61 |
| 2011/0050477 A1 | 3/2011 | Choi et al. | |
| 2013/0125436 A1 | 5/2013 | Vallar | |
| 2013/0155334 A1 | 6/2013 | Choi et al. | |
| 2014/0036159 A1 | 2/2014 | Jung | |
| 2014/0168463 A1* | 6/2014 | Tamura | H04N 9/735 348/223.1 |
| 2014/0240608 A1 | 8/2014 | Choi et al. | |
| 2015/0172586 A1 | 6/2015 | Jung | |
| 2015/0179060 A1 | 6/2015 | Choi et al. | |
| 2015/0332622 A1* | 11/2015 | Liu | G09G 3/2003 705/14.54 |
| 2016/0035285 A1 | 2/2016 | Jung | |
| 2016/0103477 A1 | 4/2016 | Park et al. | |
| 2016/0198118 A1 | 7/2016 | Kang et al. | |
| 2016/0205337 A1 | 7/2016 | Cho et al. | |
| 2017/0092118 A1 | 3/2017 | Choi et al. | |
| 2017/0196066 A1* | 7/2017 | Dong | H05B 33/0869 |
| 2018/0158321 A1 | 6/2018 | Choi et al. | |

FOREIGN PATENT DOCUMENTS

| | | |
|---|---|---|
| KR | 10-2011-0050217 | 5/2011 |
| KR | 10-2015-0146375 | 12/2015 |
| KR | 10-2016-0086129 | 7/2016 |
| KR | 10-2016-0094596 | 8/2016 |

OTHER PUBLICATIONS

Written Opinion, PCT/ISA/237, dated Apr. 5, 2018, in corresponding International Patent Application No. PCT/KR2017/015393.

* cited by examiner

DISPLAY DEVICE FOR ADJUSTING COLOR TEMPERATURE OF IMAGE AND DISPLAY METHOD FOR THE SAME

CROSS-REFERENCE TO RELATED APPLICATION(S)

This application claims the benefit under 35 U.S.C. § 119(a) of a Korean patent application filed on Dec. 22, 2016 in the Korean Intellectual Property Office and assigned Serial number 10-2016-0176329, the entire disclosure of which is hereby incorporated by reference.

TECHNICAL FIELD

The present disclosure relates to a display device for adjusting a color temperature of an image, capable of providing a picture frame function, and a display method for the same.

BACKGROUND

A display device, such as a television (TV), provides a specific function (e.g., a function of reproducing of image content) in an ON state. When the specific function is not provided, the display device may be turned off (a device off). A conventional display device may be maintained in a black-screen state if turned off.

SUMMARY

The display device may be used as an electronic picture frame for outputting a photograph, a picture, and a work of art on a display. However, since the screen of the electronic picture frame displayed by the conventional display device provides the strong electronic product feel, the conventional display device may provide the resistance to a user having analog sensibility. In addition, since the display device is a light emitting device including a display panel or a backlight, the display device may not greatly affected by a color temperature of light (e.g., illuminance) incident thereto from the outside. Accordingly, the picture frame displayed on the conventional display device cannot help having a difference from a real picture frame in terms of a texture, a color, or the like.

Aspects of the present disclosure are to address at least the above-mentioned problems and/or disadvantages and to provide at least the advantages described below. Accordingly, an aspect of the present disclosure is to provide a display device for adjusting the color temperature of the image, capable of providing a picture frame function by considering color variation due to light incident thereto from the outside, and a display method for the same.

In accordance with an aspect of the present disclosure, a display device includes a display, a sensor module which senses a color temperature of light incident to the sensor module from an outside of the display device, and a processor electrically connected to the display and the sensor module. The processor operates in a first mode or a second mode or is turned off, depending on a user input, outputs a moving picture to the display in the first mode, outputs a still image to the display if detecting a user, turns off the display if failing to detect the user, in the second mode, adjusts a color temperature of the still image based on the color temperature sensed by using the sensor module in outputting the still image, and outputs the still image having the adjusted color temperature to the display.

In accordance with another aspect of the present disclosure, a display method includes determining switching to a second mode from a first mode of outputting a moving picture or from a device off state, depending on a user, sensing a user if determining of switching to the second mode, outputting a still image to a display if sensing the user, and turning off the display if failing to sense the user. The outputting of the still image on the display includes sensing a color temperature of light incident from an outside of the display device, adjusting a color temperature of the still image based on the color temperature of the still image and the sensed color temperature of the light, and outputting the still image having the adjusted color temperature to the display.

According to the embodiments disclosed in the present disclosure, the screen of the electronic picture frame is adjusted by considering the influence by light incident from the outside such that the electronic picture frame more looks like a real picture frame for paper.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, certain embodiments of the present disclosure may be described with reference to accompanying drawings. Accordingly, those of ordinary skill in the art will recognize that modifications, equivalents, and/or alternatives on the various embodiments described herein may be made without departing from the scope and spirit of the present disclosure.

The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the another element or an intervening element (e.g., a third element) may be present there between.

In the present disclosure, according to the situation, the expression "adapted to or configured to" used herein may be interchangeably used with, for example, the expression "suitable for", "having the capacity to", "changed to", "made to", "capable of", or "designed to" "adapted to", "made to", or "capable of". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device FIG. 1 is a block diagram illustrating a display device, according to an embodiment of the present invention, and FIG. 2 is a view illustrating a shadow effect, according to an embodiment of the present invention.

Figure 1:
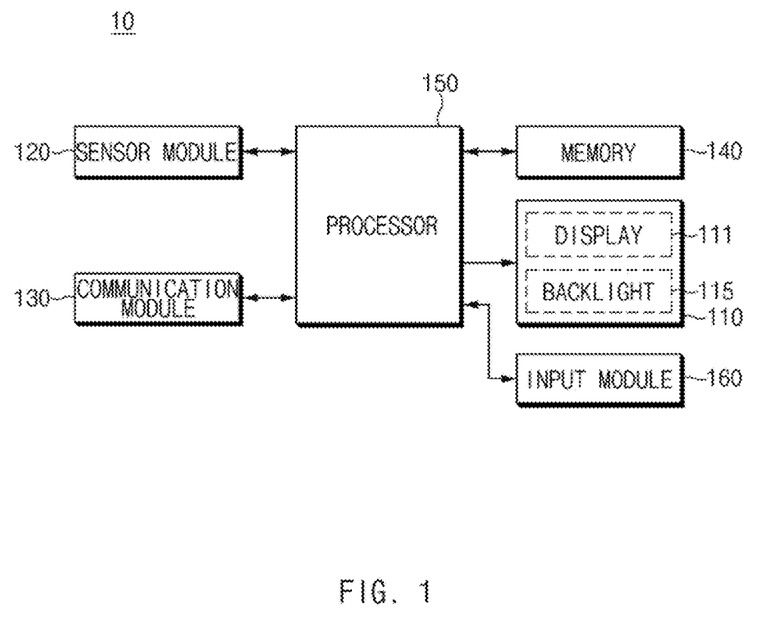
FIG. 1 is a block diagram illustrating a display device, according to an embodiment of the present invention.
Figure 2:
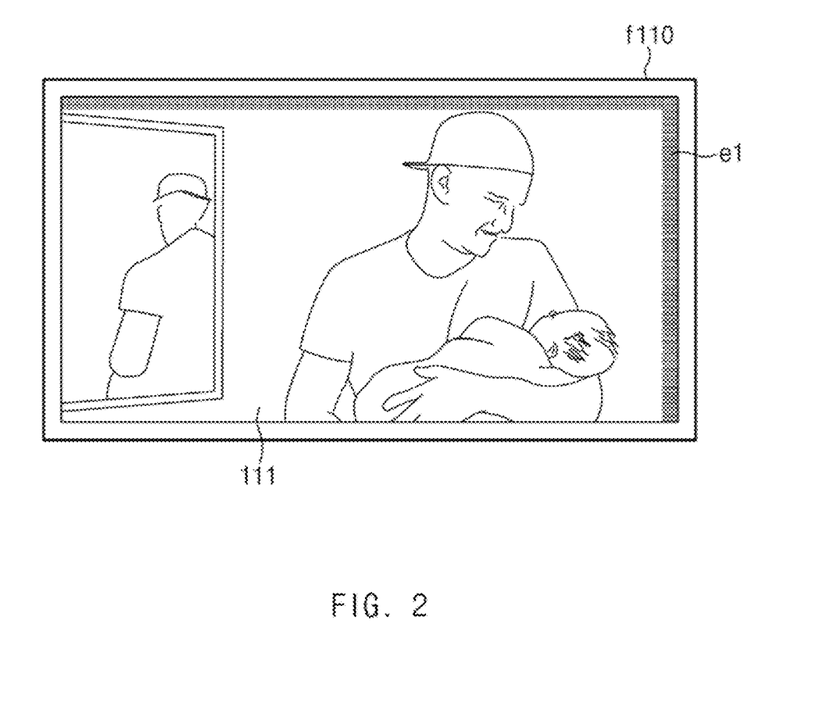
FIG. 2 is a view illustrating a shadow effect, according to an embodiment of the present invention.

Referring to FIG. 1, according to an embodiment, a display device 10 may include a display module 110, a sensor module 120, a communication module 130, a memory 140, an input module 160, and a processor 150. According to an embodiment, some elements may be omitted or additional elements may be provided. In addition, according to an embodiment, some of the elements may be combined with each other so as to form one entity and the functions of the elements may be performed in the same manner as before the combination.

According to an embodiment, the display device 10 may include at least one of a television (TV), a monitor, a notebook computer, a large format display (LFD), a smartphone, a tablet personal computer (PC), a mobile phone, a video telephone, an e-book reader, a desktop personal computer, a laptop personal computer, a netbook computer, a personal digital assistant (PDA), a portable multimedia player (PMP), an MP3 player, a camera, a wearable device, or an electronic picture frame.

A display 111 may include, for example, a liquid crystal display (LCD), a light-emitting diode (LED) display, an organic LED (OLED) display, or an electronic paper display. In FIG. 1 and the present specification, the case that the display module 110 includes the display 111 and a backlight 115 has been described for the illustrative purpose. For example, the display 111 may display various contents (e.g., a text, an image, a video, an icon and/or a symbol) to a user. The backlight 115 may be omitted when the display 111 is OLED.

According to an embodiment, the sensor module 120 may include a motion sensor to sense the movement of a user. The motion sensor may sense the movement of the user facing a display direction of the display 111. For example, the motion sensor may be provided at one area of the upper frame of the display module 110.

According to an embodiment, the sensor module 120 may include a color sensor which senses a color temperature of light (external light) incident thereto from the outside of the display device 10. The color sensor may sense at least one of a color temperature or illuminance with respect to the display direction of the display 111. To this end, the color sensor may be provided while facing the display direction of the display 111.

According to an embodiment, the sensor module 120 may output directional information of the external light. For example, the sensor module 120 may include the color sensor which outputs information on the difference between the quantities of light applied to a plurality of photo-sensors. In this case, the color sensor may be configured to output the variation in the quantity of light over time, which is applied to the photo-sensors. For example, the color sensor may be provided at one area of the upper frame of the display module 110. For another example, the sensor module 120 may include a plurality of illuminance sensors (or a plurality of color sensors) which sense the direction of light by using the sensed illuminance difference. For example, the illuminance sensors (or the color sensors) may be provided at a plurality of areas (e.g., top, bottom, left, and right areas) of a frame of the display module 110.

According to an embodiment, the communication module 130 may communicate with a registered external electronic device through a specified communication scheme. For example, the communication module 130 may make communication through at least one of Bluetooth or Bluetooth low energy (BLE). For another example, the communication module 130 may make communication through at least one of wireless fidelity (WiFi), Zigbee, or near field communication (NFC).

The memory 140 may be a volatile memory (e.g., a random access memory (RAM), or the like), a non-volatile memory (e.g., a read-only memory (ROM), a flash memory, or the like), or the combination thereof. For example, the memory 140 may store instructions or data related to at least one different element of the display device 10.

According to an embodiment, the memory 140 may store a still image (or a picture frame image). The still image may be an image displayed in a picture frame mode. The picture frame mode may be a mode for displaying the still image to utilize the display device 10 as a picture frame. The still image may be, for example, a painting, such as a landscape, a portrait, or a still life painting, and may be a photograph (e.g., a family photograph). The still image may be expressed (or displayed) on the display 111 such that a user feels as if the still image is a picture drawn on a paper or a photograph printed on paper. The still image may be one type of an image or may include a plurality of images. The still image may include an image which is changing in at least a portion thereof.

According to an embodiment, the memory 140 may store reference data (e.g., a lookup table) for adjusting the still image to correspond to at least one of the brightness or the color temperature of the external light. According to an embodiment, the memory 140 may store instructions for applying various effects to the still image. The instructions may include an instruction for applying a shadow effect to the still image corresponding to the direction of the external light. The instructions may include instructions for applying a paper effect, a canvas effect, a gloss effect or a matte effect, or the like to the still image. According to an embodiment, the memory 140 may have information for determining the color temperature of the still image based on an average pixel color (APC) ratio of sub-pixels of the still image.

According to an embodiment, the input module 160 may receive a user input. For example, the input module 160 may include at least one of a communication unit or an input button. According to an embodiment, the communication unit may communicate with a remote controller. If the remote controller transmits a control signal corresponding to a button manipulated by a user, the communication unit may receive the control signal from the remote controller and may transform the control signal to the form that is able to be analyzed by the processor 150. If the communication unit receives an instruction signal to be transmitted to the remote controller from the processor 150, the communication unit may transform the instruction signal to an instruction signal corresponding to the communication scheme of the remote controller and may transmit the instruction signal to the remote controller. The communication unit may communicate with the remote controller through various short range communication schemes such as Bluetooth, Near Field Communication (NFC), and Infrared (IR) communication schemes. The input button may be, for example, a button provided in the display device 10. According to an embodiment, the remote controller and the input button may include respective power buttons. The input module 160 may output a first user input (first signal) in response to the short press of the power button and may output a second user interface (second signal) in response to the long press of the power button.

For example, the processor 150 may include, for example, at least one of a central processing unit (CPU), a graphics processing unit (GPU), a micro-processor, application specific integrated circuits (ASICs), or a field programmable gate array (FPGA), or may have a plurality of cores. The processor 150 may perform, for example, computation or data processing related to the control and/or communication of at least one different element of the display device 10.

According to an embodiment, if the processor 150 receives the second user input (e.g., the long press of the power button) from the input module 160, a driving mode of the processor 150 may be switched from a main mode or a picture frame mode to a device off mode. The device off mode may be, for example, a mode in which an element, such as the sensor module 120, the communication module 130, the memory 140, the display module 110, or the like of the display device 10 is turned off. In the device off mode, even the processor 150 may be turned off.

According to an embodiment, if the processor 150 receives the second user input (e.g., the long press of the power button) from the input module 160 in the device off mode, the driving mode of the processor 150 may be switched from the device off mode to the main mode or the picture frame mode. For example, in the case that the mode has been switched from the main mode to the device off mode, if the processor 150 receives the second user input, the mode may be switched to the main mode. For another example, in the case that the mode has been switched from the picture frame mode to the device off mode, if the processor 150 receives the second user input, the mode may be switched to the picture frame mode. According to an embodiment, if the processor 150 receives the first user input (e.g., the short press of the power button) from the input module 160, the mode may be switched from the main mode to the picture frame mode or may be switched from the picture frame mode to the main mode. For example, the main mode may be a mode in which a moving picture may be output through the display 111. In the main mode, most elements of the display device 10 may be controlled to be turned on. For example, in the main mode, all of elements except an element (e.g., the motion sensor of the sensor module 120) for user sensing may be turned on. For another example, the picture frame mode may be a mode for outputting a still image through the display module 110 or for turning off the display module 110. In the picture frame mode, the sensor module 120 and the communication module 130 may be turned on and the display module 110 may be turned on only when the user is sensed.

According to an embodiment, the processor 150 may output a moving picture to the display 111 in the main mode (e.g., a TV viewing mode). The processor 150 may output a moving picture received from an external interface. The external interface may include an optical cable, a terrestrial antenna, high-definition multimedia interface (HDMI), digital video interface (DVI) or the like. For example, in the case that the external interface is the optical cable or the terrestrial antenna, a receiving module (not illustrated) may transform a signal received through the optical cable or the terrestrial antenna to the form that is able to be output to the display 111 such that the signal is output to the display 111. The processor 150 may output the moving picture by using the signal received from the receiving module (not illustrated).

According to an embodiment, if the processor 150 senses the user by using at least one of the sensor module 120 or the communication module 130 in the picture frame mode, the processor 150 may output a still image (e.g., a famous painting) to the display 111. If the processor 150 fails to sense the user, the processor 150 may turn off the display 111. Therefore, according to an embodiment, when a user does not use a main function of the display device such as a TV, as the picture frame function is provided, thereby producing an interior effect by using the display device 10.

According to an embodiment, the processor 150 may control the main mode and the picture frame mode at different frame rates. For example, the processor 150 may update and output a moving picture to the display 111 at a first frame rate (e.g., 60 HZ) in the main mode. For another example, the processor 150 may update and output a still image to the display 111 at a second frame rate (<the first frame rate) (e.g., 30 Hz). Therefore, according to an embodiment, when the display device 10 is driven in the picture frame mode rather than the main mode, the power consumption in the display module 110 may be reduced.

According to an embodiment, the processor 150 may control the display module 110 in the main mode and the picture frame mode at different scanning rate. For example, the processor 150 may control the display module 110 to scan a display panel at a first scanning rate (e.g., 120 Hz) in the main mode and may control the display module 110 to scan the display panel at a second scanning rate (<the first scanning rate) (e.g., 60 Hz) in the picture frame mode. Therefore, according to an embodiment, when the display device 10 is driven in the picture frame mode rather than the main mode, the power consumption in the display module 110 may be more reduced.

According to an embodiment, depending on the position of the user in the picture frame mode, the processor 150 may turn on the display module 110 to display a still image or may turn off the display module 110. According to an embodiment, when the driving mode is switched to the picture frame mode, the processor 150 may turn on a sensor (e.g., the color sensor) which provides sensing information used to adjust the color temperature of the still image in the sensor module 120.

According to an embodiment, when the processor 150 does not perform the picture frame mode (but be in a display off state), the processor 150 may determine whether the signal received from the external electronic device through the communication module 130 has strength less than a threshold strength. For example, the processor 150 may determine the strength of the received signal by using the received signal strength indicator (RSSI) of the signal received through the communication module 130. The threshold strength may be set by considering time in which the user is in the proximity of the display device 10 or time required to control the brightness of the backlight 115.

According to an embodiment, if the signal received from the external electronic device has strength less than the threshold strength, the processor 150 may turn off the display module 110.

According to an embodiment, if the processor 150 fails to sense the movement of the user when the strength of the signal received from the external electronic device is equal to or greater than the threshold strength, the processor 150 may control the backlight 115 to have a first brightness (or may perform dimming control) and may display a still image on the display module 110. Therefore, according to an embodiment, if the proximity possibility of the user is determined, the display device 10 may prepare the still image in advance and thus may rapidly output the still image to the display 111 when the user is in the proximity of the display device 10.

According to another embodiment, if the processor 150 recognizes the movement of the user, the processor 150 may control the backlight 115 to have a second brightness (≥the first brightness) and may display a still image on the display 111. If the processor 150 recognizes the movement of the user regardless of the strength of the signal received from the external electronic device, the processor 150 may control the backlight 115 to have the second brightness (≥the first brightness) and may display the still image. Therefore, according to an embodiment, when the processor 150 performs the picture frame mode, the power consumption may be reduced.

According to an embodiment, the processor 150 may determine the color temperature of the external light by using the sensing information of the sensor module 120, for example, the sensing information of the color sensor. The sensed color temperature may be varied due to light (e.g., illumination or natural light) in a space in which the display device 10 is installed.

According to an embodiment, the processor 150 may adjust the color temperature of the still image based on the color temperature of the external light and the color temperature of the still image in the picture frame mode. The color temperature of the still image may be calculated by using APC of sub-pixels of all pixels included in the still image. For example, the processor 150 may calculate APC (a first value) of all R sub-pixels included in the still image, APC (a second value) of all G sub-pixels included in the still image, and APC (a third value) of all B sub-pixels included in the still image. Then, the processor 150 may calculate the color temperature of the still image by using the APC ratio (the first value:the second value: the third value) of each sub pixel.

In this case, the processor 150 may compare the color temperature of the external light with the color temperature of the still image. If the color temperature of the external light is higher than the color temperature of the still image, the processor 150 may increase the color temperature of the still image. If the color temperature of the external light is lower than the color temperature of the still image, the processor 150 may decrease the color temperature of the still image. In this case, the processor 150 may adjust the color temperature of the still image such that the color temperature of the still image is equal to the color temperature of the external light or may adjust the color temperature of the still image to the intermediate value between the color temperature of the external light and the color temperature of the still image. The adjustment value (lookup table) of the color temperature of the still image based on the color temperatures of the external light and the still image may be determined through an experiment of comparing between paper printed with a first image and the display module 110 having the first image displayed thereon, in which the paper and the display module 110 are affected by the same external light, while adjusting the color temperature of the still image to be output to the display module 110 such that the color temperature of the first image on the display module 110 approximates the color temperature of the paper printed with the first image. If the external light and the still image have the higher color temperatures, the external light and the still image show blue light. If the external light and the still image have the lower color temperatures, the external light and the still image show red light.

For example, if the external light shows yellow light and if the still image shows red-based light, the processor 150 may adjust the color temperature of the still image to red color (still image) affected by yellow light (external light). For another example, if the external light shows yellow light and if the still image shows blue-based light, the processor 150 may adjust the color temperature of the still image to blue light affected by yellow light (external light).

According to an embodiment, the processor 150 may display, on the display 111, the still image having the color temperature adjusted based on the color temperatures of the external light and the still image. Therefore, according to an embodiment, since the color of the still image is expressed similarly to the color of an image in a real picture frame for paper (hereinafter, referred to as "paper picture frame") affected by external dimming change Therefore, according to an embodiment, since the color of the still image is expressed similarly to the real picture frame affected by the external dimming change, a user, who has analog sensibility and resistance against the electronic picture frame, may less feel the resistance against the electronic picture frame. In addition, according to an embodiment, as both of the color temperatures of the external light and the still image are considered, the still image displayed on the display 111 may be expressed more similarly to an image in the paper picture frame, According to an embodiment, the processor 150 may adjust the color temperature of the still image through a plurality of steps. First, the processor 150 may adjust the color temperature of the whole pixels of the still image in a batch. For example, in the case that the color temperature of the external light has a higher value, the processor 150 may adjust the color temperature of the whole pixels of the still image at the same ratio to increase the color temperature of the still image. Next, the processor 150 may adjust the color temperature of some pixels of the still image at a first change ratio and may adjust the color temperature of other pixels of the still image at a second change ratio. For example, if the illumination of an environment, in which the display device 10 is installed, shows yellow light, the processor 150 may adjust pixels, which show yellow light, among the whole pixels of the still image at the first change ratio, may adjust pixels, which show blue light, at the second change ratio, and may adjust pixels, which show red light, at a third change ratio. According to an embodiment, as the processor 150 adjusts the color temperature of the still image to correspond to the color temperature of the external light, the processor 150 may express the still image in a color, which is obtained by combining the color impression of the external light and the color impression of the still image. Therefore, according to an embodiment, the display 111 may be supported such that a user feels as if the display 111 is the paper picture frame affected by the color temperature of the external light.

According to an embodiment, the processor 150 may adjust the color temperature of the still image to correspond to the color temperature of the background behind the rear surface of the display module 110. The still image displayed on the display 111 may provide, to a user, a slightly different color impression depending on the color type of the background (e.g., the color of a wall surface). To correct the difference of the color impression, the processor 150 may recognize the color temperature of the background and may adjust the color temperature of the still image depending on the color temperature of the background.

According to an embodiment, the processor 150 may recognize the color temperature of the background automatically or by determining an input by a user (user input). In the case of the automatic recognition of the color temperature of the background, according to an embodiment, the display device 10 may include a camera, which photographs the background, to recognize the color temperature of the background by using an image captured by the camera. In the case of the recognition of the color temperature of the background by the user input, the processor 150 may determine the color temperature of the background based on the user input through the control signal received from the remote controller or the input module (not illustrated).

According to an embodiment, the processor 150 may determine the illuminance of the external light by using the sensing information (e.g., illuminance) of the color sensor and may output a still image by changing a still image depending on the illuminance of the external light.

According to an embodiment, as the illuminance of the external light is gradually increased (or the external light becomes brighter), the processor 150 may increase the brightness of the still image. As the illuminance of the external light is gradually decreased (or the external light becomes darker), the processor 150 may decrease the brightness of the still image. According to an embodiment, the processor 150 may adjust the brightness of the still image by adjusting at least one the pixel value of the still image or the brightness of the backlight 115. For example, in the case that the display module 110 does not include the backlight 115 (e.g., the display module 110 includes an OLED), the processor 150 may adjust only the pixel value of the still image corresponding to the illuminance of the external light. In the case that the display module 110 includes the backlight 115 (e.g., the display module 110 includes an LCD), the processor 150 may control both the pixel value of the still image and the brightness of the backlight 115 corresponding to the illuminance of the external light. The degree that the processor 150 adjusts the pixel value of the still image and the brightness of the backlight 115 corresponding to the illuminance of the external light may be experimentally determined.

According to another embodiment, the processor 150 may adjust the contrast of the still image corresponding to the illuminance of the external light. For example, if the illuminance of the external light is less than first threshold illuminance, the processor 150 may reduce the brightness of a darker area of the still image, for example, an area having the brightness less than the first threshold brightness. For another example, if the illuminance of the external light is equal to or more than the first threshold, the processor 150 may increase the brightness of an area having the brightness which is equal to or more than the second threshold brightness. The processor 150 may not additionally adjust the brightness with respect to a pixel having a brightness which is equal to or more than the first threshold brightness and less than the second threshold brightness.

According to another embodiment, the processor 150 may adjust the sharpness of the still image corresponding to the illuminance of the external light. For example, if the illuminance of the external light is less than second threshold illuminance, the processor 150 may reduce the sharpness of a darker area of the still image, for example, an area having the brightness less than the third threshold brightness. If the illuminance of the external light is equal to or more than the first threshold illuminance, the processor 150 may increase the sharpness of a brighter area of the still image, for example, an area of the still image having the brightness equal to or more than fourth threshold brightness. The processor 150 may not additionally adjust the sharpness with respect to a pixel having brightness which is equal to or more than the third threshold brightness and less than the fourth threshold brightness. The first threshold illuminance and the second threshold illuminance may be equal to each other or different from each other. Similarly, the first threshold brightness and the third threshold brightness may be equal to or different from each other and the second threshold brightness and the fourth threshold brightness may be equal to or different from each other. The first threshold illuminance and second threshold illuminance and the first threshold brightness to fourth threshold brightness may be determined by an experiment.

According to an embodiment, the processor 150 may adjust the brightness of the still image depending on the brightness of the background of the display module 110. For example, in the case that the background has a higher brightness, the processor 150 may increase the brightness of the still image. In the case of the background has lower brightness, the processor 150 may decrease the brightness of the still image. Even in this case, the processor 150 may adjust at least one of the pixel value of the still image or the brightness of the backlight 115. The degree of increasing or decreasing the brightness of the still image corresponding to the brightness of the background by the processor 150 may be experimentally determined.

According to an embodiment, the processor 150 may determine the direction of the external light of the display device 10 by using the sensor module 120. For example, the color sensor (or the camera sensor) may output sensing information (e.g., images over time) for determining the temporal change in the quantity of light measured by a plurality of photo-sensors. Then, the processor 150 may determine the direction of the external light by using the difference between the quantities of light measured by at least two photo-sensors. For another example, the display device 10 may determine the direction of the external light by using a plurality of illuminance sensors (or a plurality of color sensors). For example, the illuminance sensors may be provided in a plurality of areas (e.g., top, bottom, left, and right areas) of a frame f110 of the display module 110 and the processor 150 may determine the direction of light based on the display module 110 by using the difference in illuminance between the illuminance sensors.

According to an embodiment, the processor 150 may apply the shadow effect to the still image corresponding to the direction of the external light. For example, the frame f110 may be provided at a peripheral portion (edge) of the display module 110. Referring to FIG. 2, the processor 150 may apply a shadow effect (see reference sign e1) to the still image by adjusting the value of a pixel, which is close to the frame f110 of the display device 10, among the pixels of the still image displayed on the display 111 to a brighter value or a darker value depending on the direction of the external light. Therefore, according to an embodiment, a shadow may be expressed on the still image corresponding to the direction of the external light.

According to an embodiment, the processor 150 may output a still image after applying a paper effect to the still image such that the display 111 may have a paper feel. For example, as the processor 150 relatively reduces the sharpness and the contrast of the still image, the still image may be shown as if the still image is a paper image. Therefore, according to an embodiment, the display device may be shown as if the display device 10 is more similar to a real picture frame.

According to an embodiment, the processor 150 may apply various effects to the still image. For example, the processor 150 may apply a canvas effect, a gloss effect, a matte effect, or the like to the still image by adjusting pixel values of the still image. Therefore, according to an embodiment, the display device 10 is shown as if the display device 10 is closer to the real picture frame.

According to an embodiment, the processor 150 may store the still image, which is subject to the canvas effect, the gloss effect, the matte effect, or the like, in the memory 140. Thereafter, the processor 150 may perform the above-described adjustment by using the still image subject to the above effects. According to an embodiment, the illumination (or the color temperature) of the environment, in which the display device 10 is installed, may be rarely changed as long as the display device 10 is not moved to be installed in another place. Therefore, the processor 150 may adjust the color temperature of the still image depending on the color temperature of the external light and may store the adjusted still image in the memory 140. Then, the processor 150 may output the adjusted still image to the display 111 if the color temperature and the illuminance of the external light are not changed. Therefore, according to an embodiment, time taken to apply an effect in the picture frame mode may be reduced.

According to an embodiment, since the display device 10 including the light emitting device is not greatly affected by the color temperature of the external light (e.g., illumination), the display device 10 may overcome the problem of the related art of providing only the feel of an electronic product, which performs a picture frame function, providing the feel of the real picture frame.

Figure 3:
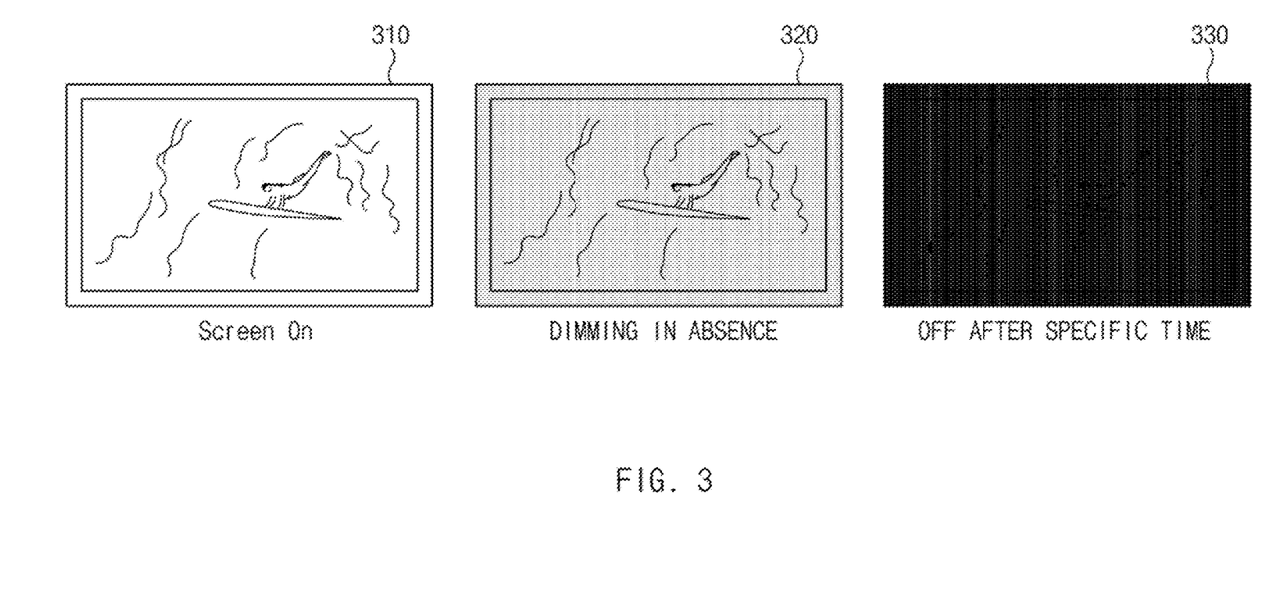
FIG. 3 is a view illustrating controlling a picture frame function, according to an embodiment of the present invention.

As described above, according to an embodiment, the case that the processor 150 adjusts the color temperature of the still image in the picture frame mode has been described for the illustrative purpose. In contrast, the processor 150 may adjust the color temperature of a moving picture in the main mode. FIG. 3 is a view illustrating controlling the picture frame function, according to an embodiment of the present invention.

Referring to FIG. 3, in operation 310, the processor 150 may control the backlight 115 to have the first brightness and thus may operate in the picture frame mode, if detecting the movement of the user by using the motion sensor. In operation 310, the processor 150 may detect the movement of a user by using the motion sensor to determine whether the control of the brightness of the backlight 115 or the off control of the display module 110 is necessary. In operation 310, the processor 150 may operate in the main mode according to the input of the user while performing the picture frame mode.

In operation 320, the processor 150 may determine whether a signal received from the external electric device has strength equal to or greater than threshold strength if the processor 150 does not detect the movement of the user. If the processor 150 does not detect the movement of the user and if the processor 150 determines that the signal received from the external electronic device has the strength equal to or greater than the threshold strength, the processor 150 may control the brightness of the backlight 115 to be the second brightness (≤first brightness). In operation 320, the processor 150 controls the backlight 115 to have the second brightness while determining whether a signal received from the external electronic device through the communication module 130 has strength less than the threshold strength. In operation 320, the processor 150 may receive the signal from the external electronic device through the BLE.

In operation 330, if the signal from the external electronic device has the strength less than the threshold strength, the processor 150 may re-determine whether the signal received from the external electronic device has the strength less than the threshold strength after a specified period elapses. The processor 150 may control the display module 110 to be turned off if the signal received from the external electronic device has the strength less than the threshold strength according to the re-determination result. In operation 330, the processor 150 may turn off elements other than the display module 110. For example, the processor 150 may periodically operate specified elements (e.g., the communication module) to determine whether the signal received from the external electronic device has strength equal to or more than the threshold strength. As described above, the processor 150 may perform the operation 320 if the signal received from the external electronic device has the strength equal to or more than the threshold strength. If detecting the movement of the user, the processor 150 may perform operation 310. As described above, according to an embodiment, the processor 150 may determine the proximity of the user or the proximity possibility of the user to selectively perform the picture frame mode. Accordingly the power consumption in the picture frame mode may be reduced.

According to an embodiment, when the picture frame function is performed by the display device, the power consumption may be reduced, thereby reducing the cost burden on the user.

Figure 4:
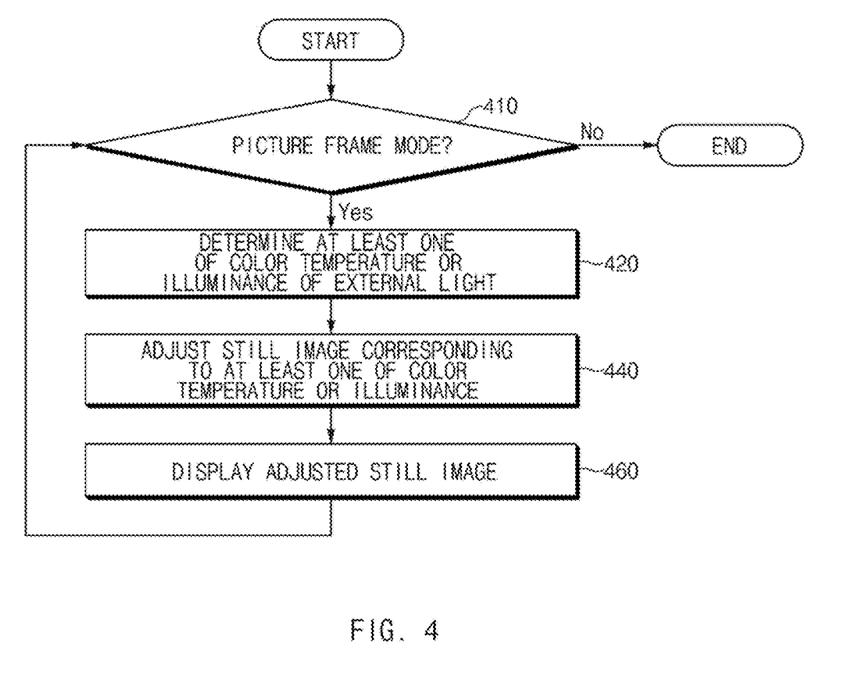
FIG. 4 is a flowchart illustrating adjusting a still image, according to an embodiment of the present invention.

FIG. 4 is a flowchart illustrating adjusting a still image, according to an embodiment of the present invention.

Referring to FIG. 4, in operation 410, the processor 150 may determine whether a driving mode is the picture frame mode. The processor 150 may switch to the picture frame mode from the main mode of outputting a moving picture or from the device off state, depending on a user input. According to an embodiment, when the processor 150 switches from the device off state to the picture frame mode, the processor 150 may turn on a sensor (e.g., the color sensor) for providing sensing information used to adjust the still image in the sensor module 120.

In operation 420, the processor 150 may determine at least one of a color temperature or the illuminance of the external light through the sensor module 120 in the picture frame mode. For example, the processor 150 may determine at least one of the color temperature or the illuminance of the external light by using the color sensor. The processor 150 may determine the direction of light by analyzing the image received from the color sensor.

In operation 440, the processor 150 may adjust the still image corresponding to at least one of the determined color temperature or the determined illuminance. For example, the processor 150 may adjust the color temperature of the still image to correspond to the color temperature of the external light. For another example, the processor 150 may adjust at least one of a pixel value of the still image or the backlight 115, thereby adjusting the brightness of the still image to correspond to the illuminance of the external light. For another example, the processor 150 may adjust at least one of contrast or sharpness of the still image to correspond to the illuminance of the external light. Since the adjustment of the still image corresponding to the at least one of the determined color temperature or the determined illuminance has been described above, the details thereof will be omitted. In operation 440, when the shadow effect is set, the processor 150 may apply the shadow effect to the adjusted still image corresponding to the determined direction of light. In operation 440, the processor 150 may store the still image, which is adjusted and subject to the effects, in the memory 140.

In operation 460, the processor 150 may output the adjusted still image to the display 111. The processor 150 may express the still image while performing operation 410 to 460 until the execution of the picture frame mode is terminated due to the signal from the external electronic device and the detection of the movement of the user.

According to an embodiment, as the color impression of the still image expressed in the picture frame mode is adjusted corresponding to the color temperature and the illuminance of the external light, the display device 10 may be supported such that the display device 10 is shown as if the display device 10 is a real picture frame.

According to an embodiment, as a shadow is expressed on the front frame of the display corresponding to the direction of the external light, the still image may be shown as if the still image is more similar to an image in a real picture frame.

According to an embodiment, the display device 10, which allows a user to feel analog sensibility, may be provided. In addition, even if the user does not use the main function of the display device 10, the digital device 10 may be used as an interior piece. Accordingly, the utilization of the display device 10 may be increased.

While the present disclosure has been shown and described with reference to various embodiments thereof, it will be understood by those skilled in the art that various changes in form and details may be made therein without departing from the spirit and scope of the present disclosure as defined by the appended claims and their equivalents.

According to embodiment, an display device includes a display; a sensor module configured to sense a color temperature of light incident to the sensor module from an outside of the display device; and a processor electrically connected to the display and the sensor module, wherein the processor is configured to operate in a first mode or a second mode or be turned off, depending on a user input; output a moving picture to the display in the first mode; output a still image to the display if detecting a user and turn off the display if failing to detect the user, in the second mode; adjust a color temperature of the still image based on the color temperature sensed by using the sensor module in outputting the still image; and output the still image having the adjusted color temperature to the display.

According to embodiment, the display device further includes a communication module configured to communicate with an external electronic device, wherein the sensor module includes a motion sensor configured to sense movement of the user, and wherein the processor is configured to output the still image to the display by adjusting a backlight of the display to have a first brightness, if sensing the movement of the user by using the motion sensor; determine whether a signal received from the external electronic device has strength equal to or greater than threshold strength if failing to sensing the movement of the user; output the still image to the display by adjusting the backlight of the display to have a second brightness less than the first brightness if the received signal has the strength equal to or greater than the threshold strength; and turn off the display if the received signal has strength less than the threshold strength.

The processor is configured to update the moving picture to the display at a first frame rate in the first mode; and update the still image to the display at a second frame rate in the second mode, and wherein the second frame rate is lower than the first frame rate.

The processor is configured to adjust color temperatures of whole pixels of the still image by using a specified change ratio.

The processor is configured to adjust color temperatures of some pixels among the whole pixels by using a first change ratio; and adjust color temperatures of other pixels among the whole pixels by using a second change ratio.

The processor is configured to determine a background behind a rear surface of the display from the user input; and adjust a color temperature of the still image to correspond to the background.

The processor is configured to adjust a brightness of the still image to correspond to a brightness of the background.

The processor is configured to reduce at least one of contrast or sharpness of the still image.

The sensor module is configured to sense illuminance of the light and to adjust a brightness of the still image to correspond to the illuminance of the light.

The processor is configured to decrease a brightness of an area of the still image, which has less than a first brightness, if the illuminance of the light is less than a first threshold value; and increase a brightness of an area of the still image, which has at least a second brightness, if the illuminance of the light is equal to or greater than the first threshold value.

The processor is configured to increase sharpness of an area of the still image, which has less than a first brightness, if the illuminance of the light is less than a first threshold value; and decrease sharpness of an area of the still image, which has at least a second brightness, if the illuminance of the light is equal to or greater than the first threshold value.

The sensor module senses a direction of the light, and wherein the processor is configured to apply a shadow effect to an area of the still image, which corresponds to an edge of the display, in accordance with the direction of the light.

The sensor module include a color sensor configured to output information on variation in a quantity of the light over time, which is applied to a plurality of photo-sensors, and wherein the processor is configured to determine the direction of the light by using the information on the variation in the quantity of the light over time.

According to an embodiment, a display method by a display device, the display method includes determining switching to a second mode from a first mode of outputting a moving picture or from a device off state, depending on a user input; sensing a user if determining of switching to the second mode; outputting a still image to a display if sensing the user; and turning off the display if failing to sense the user, wherein the outputting of the still image includes sensing a color temperature of light incident from an outside of the display device; adjusting a color temperature of the still image based on the color temperature of the still image and the sensed color temperature of the light; and outputting the still image having the adjusted color temperature to the display.

The adjusting of the color temperature of the still image includes adjusting color temperatures of whole pixels of the still image by using a specified change ratio.

The adjusting of the color temperature of the still image further includes adjusting color temperatures of some pixels among the whole pixels by using a first change ratio; and adjusting color temperatures of other pixels among the whole pixels by using a second change ratio.

According to an embodiment, the display method further includes sensing illuminance of the light; and adjusting a brightness of the still image to correspond to the illuminance of the light.

According to an embodiment, the display method, further includes sensing illuminance of the light; decreasing a brightness of an area of the still image, which has less than a first brightness, if the illuminance of the light is less than a first threshold value; and increasing a brightness of an area of the still image, which has less than a second brightness, if the illuminance of the light is equal to or more than the first threshold value.

According to an embodiment, the display method further includes sensing illuminance of the light; increasing sharpness of an area of the still image, which has less than a first brightness, if the illuminance of the light is less than a first threshold value; and decreasing sharpness of an area of the still image, which has at least a second brightness, if the illuminance of the light is equal to or greater than the first threshold value.

According to an embodiment, the display method further includes sensing a direction of the light incident from the outside; and applying a shadow effect to an area of the still image, which corresponds to an edge of the display, in accordance with the direction of the light.

The term "module" as used in the present disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment of the present disclosure may be, for example, implemented by instructions stored in a computer-readable storage media in the form of a program module. The instruction, when executed by a processor 150, may cause the one or more processors to perform a function corresponding to the instruction. The computer-readable storage media, for example, may be the memory 140.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display device comprising:
a display;
a sensor module configured to sense a color temperature of light incident to the sensor module from an outside of the display device; and
a processor electrically connected to the display and the sensor module,
wherein the processor is configured to:
operate in one of a first mode and a second mode depending on a user input;
in the first mode, output a moving picture to the display;
in the second mode,
when a user is detected, compare a color temperature of a still image to the color temperature sensed by using the sensor module, adjust the color temperature of the still image based on the comparison of the color temperature of the still image to the color temperature sensed by using the sensor module, and output the still image having the adjusted color temperature to the display; and
when the user is not detected, turn off the display,
wherein the processor is further configured to:
identify a background object behind a rear surface of the display device, and
adjust a color temperature of the still image based on a color temperature of the background object.

2. The display device of claim 1, further comprising:
a communication module configured to communicate with an external electronic device,
wherein the sensor module includes a motion sensor configured to sense movement of the user, and
wherein the processor is configured to:
output the still image to the display by adjusting a backlight of the display to have a first brightness, when the movement of the user is sensed by using the motion sensor;
determine whether a signal received from the external electronic device has a strength equal to or greater than a threshold strength when the movement of the user is not sensed;
output the still image to the display by adjusting the backlight of the display to have a second brightness less than the first brightness when it is determined the signal received from the external electronic device has the strength equal to or greater than the threshold strength; and
turn off the display when it is determined the signal received from the external electronic device has a strength less than the threshold strength.

3. The display device of claim 1, wherein the processor is configured to:
 update the moving picture output to the display at a first frame rate in the first mode; and
 update the still image output to the display at a second frame rate in the second mode, and
 wherein the second frame rate is lower than the first frame rate.

4. The display device of claim 1, wherein the processor is configured to:
 adjust color temperatures of whole pixels of the still image by using a specified change ratio.

5. The display device of claim 4, wherein the processor is configured to:
 adjust color temperatures of some pixels among the whole pixels by using a first change ratio; and
 adjust color temperatures of other pixels among the whole pixels by using a second change ratio.

6. The display device of claim 1, wherein the processor is configured to:
 adjust a brightness of the still image to correspond to a brightness of the background.

7. The display device of claim 1, wherein the processor is configured to:
 reduce one or both of a contrast and a sharpness of the still image.

8. The display device of claim 1, wherein the sensor module is configured to:
 sense illuminance of the light; and
 adjust a brightness of the still image to correspond to the illuminance of the light.

9. The display device of claim 8, wherein the processor is configured to:
 decrease a brightness of a first area of the still image, the first area having less than a first brightness, when the illuminance of the light is less than a first threshold value; and
 increase a brightness of a second area of the still image, the second area having at least a second brightness, when the illuminance of the light is equal to or greater than the first threshold value.

10. The display device of claim 8, wherein the processor is configured to:
 increase sharpness of a first area of the still image, the first area having less than a first brightness, when the illuminance of the light is less than a first threshold value; and
 decrease sharpness of a second area of the still image, the second area having at least a second brightness, when the illuminance of the light is equal to or greater than the first threshold value.

11. The display device of claim 1, wherein the sensor module senses a direction of the light, and
 wherein the processor is configured to:
 apply a shadow effect to an area of the still image, the area of the image corresponding to an edge of the display, in accordance with the direction of the light.

12. The display device of claim 11, wherein the light is applied to a plurality of photo-sensors and the sensor module includes a color sensor configured to output information on variation in a quantity of the light over time, and
 wherein the processor is configured to:
 determine the direction of the light by using the information on the variation in the quantity of the light over time.

13. A display method by a display device, the display method comprising:
 determining that a mode related to the display device has been switched to a second mode from either a first mode of outputting a moving picture or from a device off state, depending on a user input; and
 in the second mode,
 when a user is not detected, turning off a display; and
 when the user is detected, sensing a color temperature of light incident from an outside of the display device, comparing a color temperature of a still image to the color temperature of the light, adjusting the color temperature of the still image based on the comparison of the color temperature of the still image to the color temperature of the light, and outputting the still image having the adjusted color temperature to the display,
 wherein the method further comprises:
 identifying a background object behind a rear surface of the display device, and
 adjusting a color temperature of the still image based on a color temperature of the background object.

14. The display method of claim 13, wherein the adjusting of the color temperature of the still image includes:
 adjusting color temperatures of whole pixels of the still image by using a specified change ratio.

15. The display method of claim 14, wherein the adjusting of the color temperature of the still image further includes:
 adjusting color temperatures of some pixels among the whole pixels by using a first change ratio; and
 adjusting color temperatures of other pixels among the whole pixels by using a second change ratio.

16. The display method of claim 13, further comprising: sensing illuminance of the light; and
 adjusting a brightness of the still image to correspond to the illuminance of the light.

17. The display method of claim 13, further comprising: sensing illuminance of the light;
 decreasing a brightness of a first area of the still image, the first area having less than a first brightness, when the illuminance of the light is less than a first threshold value; and
 increasing a brightness of a second area of the still image, the second area having less than a second brightness, when the illuminance of the light is equal to or more than the first threshold value.

18. The display method of claim 13, further comprising: sensing illuminance of the light;
 increasing sharpness of a first area of the still image, the first area having less than a first brightness, when the illuminance of the light is less than a first threshold value; and
 decreasing sharpness of a second area of the still image, the second area having at least a second brightness, when the illuminance of the light is equal to or greater than the first threshold value.

19. The display method of claim 13, further comprising: sensing a direction of the light incident from the outside; and
 applying a shadow effect to an area of the still image, the area corresponding to an edge of the display, in accordance with the direction of the light.

* * * * *